H. W. LEONARD.
ELECTRICAL CONTROLLING MEANS.
APPLICATION FILED JULY 12, 1905. RENEWED JAN. 7, 1910.

1,003,924.

Patented Sept. 19, 1911.
4 SHEETS—SHEET 1.

Witnesses
H. Ward Leonard Inventor
By his Attorney

Fig. 4.

H. W. LEONARD.
ELECTRICAL CONTROLLING MEANS.
APPLICATION FILED JULY 12, 1905. RENEWED JAN. 7, 1910.

1,003,924.

Patented Sept. 19, 1911.
4 SHEETS—SHEET 4.

Fig. 6

Witnesses
S. K. Sager.
Geo. N. Kerr.

H. Ward Leonard Inventor
By his Attorney C. V. Edwards

UNITED STATES PATENT OFFICE.

HARRY WARD LEONARD, OF BRONXVILLE, NEW YORK.

ELECTRICAL CONTROLLING MEANS.

1,003,924.

Specification of Letters Patent. Patented Sept. 19, 1911.

Application filed July 12, 1905, Serial No. 269,331. Renewed January 7, 1910. Serial No. 536,924.

*To all whom it may concern:*

Be it known that I, HARRY WARD LEONARD, a citizen of the United States, residing at Bronxville, in the county of Westchester and State of New York, have invented certain new and useful Improvements in Electrical Controlling Means, of which the following is a full, clear, and exact specification.

My invention relates to the electrical control of translating devices and particularly to the control of electromotive force applied to electric motors for varying the speed thereof, or to other translating devices for other purposes.

My invention is of advantage in cases where a wide range of control is required and also where the change in speed or electromotive force applied to the translating device is required to be gradual and capable of change in small amounts.

In accordance with my invention I provide supply mains which are maintained at practically fixed potentials differing from each other by certain amounts and combine therewith means for obtaining a change of electromotive force applied to the translating device which will gradually extend from a minimum to the potential difference of one pair of supply mains, and if desired then gradually extend to that of another pair of supply mains and so on. I also apply to the motor or other translating device, an electromotive force which is considerably in excess of that of the maximum potential difference of the supply mains and may also reverse the electromotive force applied.

My invention will be understood from the following description and accompanying drawings, in which—

Figure 1:
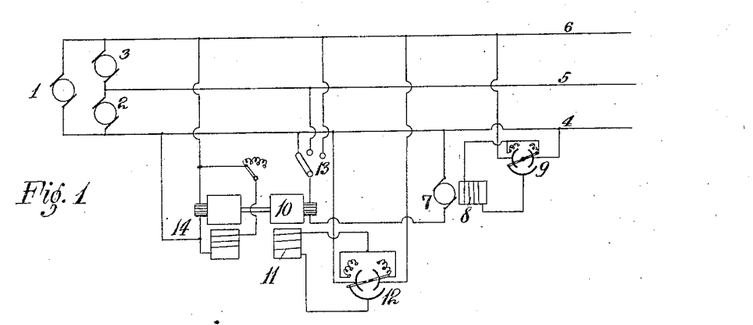
Figure 1 is a diagram of apparatus and connections of one form of my invention.

Referring to Fig. 1, a main source of direct current energy of constant electromotive force is indicated at 1. Between the terminals of the source 1 are connected in series the armatures 2, 3 of dynamo electric machines. These machines are connected to the mains 4, 5, 6 and maintain their potentials practically constant. The mains 4, 6 are connected to the outside terminals of the source 1 and machines 2, 3, and the main 5 is connected to the inner terminals or common connection of the machines 2, 3. These machines being of substantially constant electromotive force and rotating at a constant speed maintain the potential of the mains 4, 5, 6, constant as is now well understood. The electromotive force of the machines 2, 3 when added together equal that of the source and if the electromotive force of machines 2, 3 are equal to each other the voltage between main 5 and either of the outside mains will be one half of that between the mains 4, 6. The armature of the motor to be driven is indicated at 7 and its field 8, being connected across the mains 4, 6, may have a constant strength although I have shown a reversing rheostat 9 in the field circuit for adjustment or reversal of the field strength as may be desired in some cases. At 10 is indicated a source of variable electromotive force which in this instance is the armature of a dynamo electric machine. This may be made to supply a variable electromotive force by varying its speed while rotating in a field of constant strength, by keeping the speed constant and varying the field strength, by combining these methods, and in other ways, but I preferably drive the armature 10 at constant speed and vary its field strength. The field winding 11 of the armature 10 is connected through a reversing field rheostat 12 across the mains 4, 6. Its strength may therefore be varied as desired from zero to a maximum and may be reversed and similarly varied. One terminal of the motor armature 7 is connected to one of the outside wires of the supply mains, such as 4, and the other is connected to one terminal of armature 10, the other terminal of armature 10 being adapted to be connected by switch 13 to either main 4, 5 or 6. The armature 10 is shown as driven by the motor 14 coupled thereto forming a motor generator. The field and armature of the motor 14 is connected across the mains 4, 6 giving substantially constant speed to the armature 10, or if desired, the speed may be varied by means of the rheostat in the field circuit. We may assume for one example that the electromotive force of the source 1 is 200 volts, that of the machines 2, 3 each 100, that of the armature 10 to be 100, and that of the armature 7 to be 300 volts. The ampere capacity of the armatures 7, 10 will be equal and may be say 10 amperes. We may also assume that the potential of main 4 is zero, that of main 5, 100; and that of main 6, 200. With the connections as shown in Fig. 1, the armatures 7, 10 are connected in series and to the main 4. If the circuit of the field winding 11 is open at the rheostat 12, the electromotive force generated by armature 10 will be zero or very slight and the electromotive force applied to the motor armature 7 will be a minimum. If the arm of the rheostat 12 is now turned to insert the field resistance and in such a direction that the electromotive force generated by armature 10 is positive, or in other words approaches that between the mains 4, 5, then the electromotive force applied to the armature 7 will be equal to that generated by the armature 10 and the motor will be operated at a speed corresponding to the electromotive force applied. The electromotive force generated by armature 10 and that applied to the motor may be gradually increased by cutting out the resistance in the circuit of field 11 which gives absolute and uniform control of the electromotive force and therefore of the speed of the motor. When all the field resistance is cut out, the armature 10 will generate its maximum electromotive force of 100 volts. This is equal to the potential difference between the mains 4, 5 and the motor may be driven at the same speed by connecting the armature 7 across the mains 4, 5. A similar effect may be secured by opening the circuit of field 11 so as to reduce the electromotive force of armature 10 to zero or thereabout, and changing the connection of one terminal of armature 10 from main 4 to main 5 by means of switch 13. The armatures 7, 10 will then be connected in series across mains 4, 5 and as armature 10 generates no electromotive force the armature 7 will be subjected to the electromotive force of 100 volts between the mains 4, 5. With these connections, the electromotive force applied to the motor may be increased by gradually increasing the field strength and the motor will then receive the electromotive force of 100 volts between the mains 4, 5, plus that generated by the armature 10. The electromotive force may thus be increased to 200 volts when 100 volts generated by the armature 10 will be added to the 100 volts between the mains 4, 5. This same electromotive force and corresponding speed of the motor may be obtained by connecting the armature 7 across the mains 4, 6. It may likewise be obtained by reducing the strength of field 11 to zero and changing the connection of one terminal of armature 10 to main 6 by means of switch 13. Armatures 7 and 10 will now be connected in series across the mains 4, 6 and as armature 10 generates no electromotive force the armature 7 will be subjected to 200 volts. The electromotive force applied to the motor may now be increased by increasing the field strength of the field 11; the motor will then receive the 200 volts of the mains 4, 6 plus that generated by the armature 10. As the electromotive force of the latter may be raised to 100 volts, the motor can be subjected to a maximum electromotive force of 200 plus 100, or 300 volts. Hence by means of the generator of variable electromotive force, I am not only enabled to obtain a gradual control of electromotive force between the voltages of the mains, but I can also obtain a maximum electromotive force fifty per cent. greater than the maximum electromotive force of the supply mains. Moreover, by moving switch 13 to connect the armature terminal to main 4 and by reversing the field rheostat 12, the electromotive force generated by the armature 10 will be in the reverse direction and may be gradually increased to 100 volts. This reversed electromotive force applied to the armature 7 will reverse its direction of rotation and give a maximum reversed speed corresponding to 100 volts. The total range obtained is consequently 400 volts, 300 in a positive direction and 100 in a negative direction. Under the above assumption the capacity of the motor will be 10 amperes at 300 volts or 3,000 watts, whereas that of the controlling generator will be 10 amperes at 100 volts or 1,000 watts. The capacity of the controlling generator is therefore only one-third of that of the motor. Also with this system of control a minimum amount of energy is required. It will also be understood that if desired, the field 11 may be reversed and controlled by means of the rheostat 12 when the armature 10 is connected in series with the motor armature 7 between the intermediate conductor and an outside conductor and that by this means the electromotive force applied to the motor may be varied from zero to the maximum electromotive force between the outside mains, thus securing the effects described in my Patent No. 611,970, granted October 4, 1898.

Figure 2:
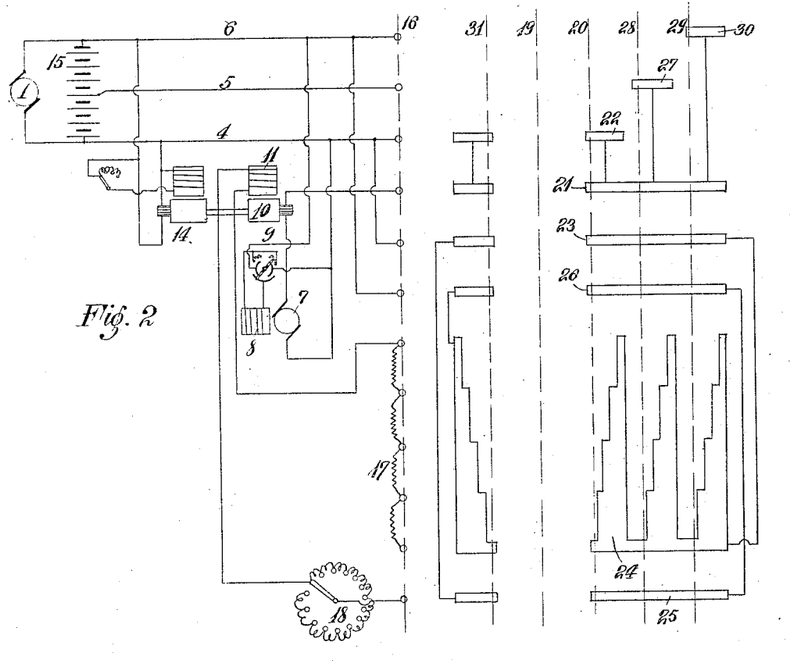
Fig. 2 is a diagram of connections and development of controlling switch embodying my invention.

In Fig. 2 are shown the connections and a development of a controlling switch by the movement of which the electromotive force applied to the motor is gradually increased to the maximum amount or reversed. The source of energy is shown at 1 and the storage battery 15 is used in place of the machines 2, 3 for maintaining the potential of the main 5. The connections of the parts 7, 8, 9, 10, 11 and 14 are similar to those described in Fig. 1 except that the leads whose connections are to be changed are connected to a set of contacts on line 16. The field winding 11 is connected in series with a variable resistance 17, the sections of which are also connected to contacts on line 16. I have also shown in series with the field winding a rheostat 18 which may be used in some instances for slight adjustments or adjustments over a wide range in conjunction with the variable resistance 17. When the controlling switch is turned so that the contacts on line 16 are on line 19, the switch is in the off position. When on line 20, the connections will be as follows: The armatures 7 and 10 will be connected in series and the conducting portions 21, 22 will connect one terminal of armature 10 to the main 4. The connection of the field 11 will extend from the main 4 to conductors 23, 24, out through the resistance 17, through coil 11 to conductor 25, 26, to main 6. The armature 7 will therefore be subjected to the low voltage generated by armature 10 when all the resistance 17 is in the field circuit and the speed of the motor will be low. By moving the controlling switch, the contacts to which the resistance 17 is connected will successively engage the conductor 24 and the resistance sections will be gradually cut out. The increased field strength will increase the electromotive force applied to the motor and when the field has its full strength, the electromotive force will be equal to that of the mains 4, 5. Further movement of the controller will cause the connection of the armature 10 to main 4 to be broken at conductor 22 and all of the resistance 17 will be inserted in the field circuit. Continued movement of the controller will connect the terminal of armature 10 to main 5 through conductors 21, 27, the contacts on line 16 now being on line 28. The electromotive force applied to the motor will now be equal to the voltage of the mains 4, 5 and that generated by armature 10 when all the resistance 17 is in the field circuit. This resistance 17 will next be cut out of circuit by sections to increase the electromotive force, and when all out, the motor will receive the maximum electromotive force generated by armature 10 in addition to that of the mains 4, 5. Movement of the controlling switch now breaks the connection of armature 10 to the main 5 at conductor 27 and the field resistance 17 is again inserted in circuit. When contact is made on line 29, the armature 10 is connected to the main 6 through conductor 30. The motor will now receive the electromotive force of the mains 4, 6, plus that generated by the armature 10 when the resistance 17 is in the field circuit. Movement of the controller will now gradually cut out the field resistance and in the final position the maximum electromotive force is applied to the motor, being that of the mains 4, 6 added to the maximum electromotive force generated by armature 10. When the controlling switch is turned back, the connections take place in the reverse order and the electromotive force applied to the motor is gradually reduced. When the controlling switch is moved from the off position so that contact is made on line 31, the connections will be similar to those made on line 20, except that the direction of current through the field winding 11 will be reversed. This will reverse the electromotive force generated by armature 10 and consequently reverse the direction of rotation of the motor. Continued movement of the switch in the reverse direction will gradually cut out the sections of resistance 17 and the reversed electromotive force applied to the motor will be gradually increased to the maximum electromotive force of the armature 10. It is thus seen that by the use of a single controlling switch, the connections and field control are varied so as to give a gradually increasing electromotive force to the motor or other translating device, to the maximum value and also a reversed electromotive force equal to that generated by the armature 10.

Figure 3:
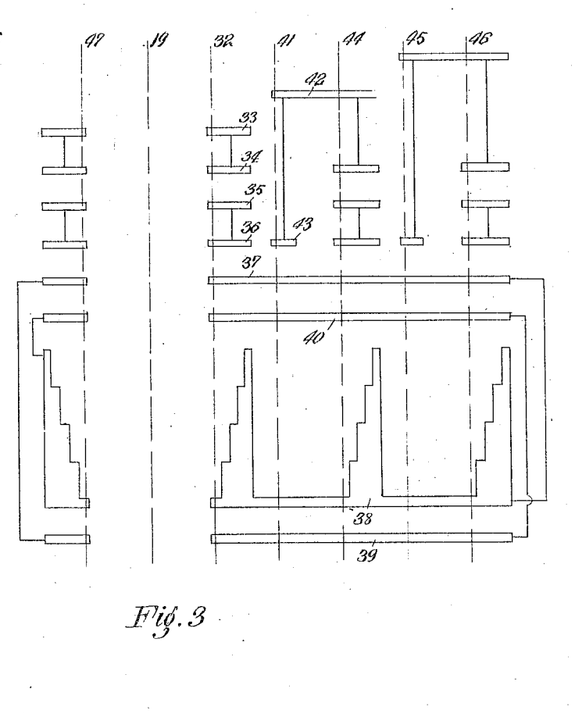
Fig. 3 is a similar figure showing a modification.

In Fig. 3 the development of a controlling switch is shown which varies and reverses the electromotive force applied to the motor, but the connections are somewhat different from those described with reference to Fig. 2. Parts similarly designated indicate the corresponding parts in Fig. 2. When the contacts on line 16 are on line 19, the switch is in the off position. If the switch is moved so that the contacts are on line 32, the connections will be as follows: from main 4 to conductors 33, 34, through armature 10 to conductors 35, 36, through armature 7 to main 4; also from main 4 to conductors 37, 38, through resistance 17, coil 11, to conductors 39, 40, to main 6. The connections are therefore such that the armature 7 is subjected to the electromotive force generated by armature 10 when the resistance 17 is in the field circuit. Movement of the controller will gradually cut out sections of this resistance and the electromotive force applied to the motor will gradually increase. When the field 11 has its full strength the motor will receive the maximum electromotive force generated by armature 10. This may be less than the electromotive force between the mains 4, 5 since further movement of the controlling switch causes the motor armature 7 to be connected across the mains 4, 5 when it will then receive the voltage of those mains. The connections to secure this increased electromotive force are obtained when contact is made on line 41, current then passing from main 5 to conductors 42, 43 through armature 7 to main 4. The switch will next connect the armatures 7 and 10 in series across the mains 4, 5, all resistance 17 being then inserted in the field circuit. This condition is reached when contact is made on line 44. The motor now receives the electromotive force of the mains 4, 5 plus that generated by armature 10 which is gradually increased by cutting out the resistance 17 until it approaches or nearly equals that of the mains 4, 6. The connections are then changed so as to connect the armature 7 directly across the mains 4, 6 so that the motor receives the electromotive force of these mains. This connection is secured when the contact is on line 45. When contact is on line 46, the armatures 7, 10 are connected in series across the mains 4, 6 and the motor armature receives the electromotive force of the mains 4, 6 plus that generated by armature 10 when the resistance 17 is in the field circuit. The further movement of the switch to cut out the resistance 17 will increase the electromotive force generated by armature 10 until the motor receives the maximum electromotive force of the supply mains plus the maximum electromotive force of the armature 10. Upon reversing the movement of the controlling switch, the electromotive force applied to the motor is gradually diminished from the maximum value until the switch is placed in off position. When it is desired to reverse the motor, the controlling switch will be moved so that contact is made on line 47. The connections are then similar to those made on line 41, except that the direction of current through the field winding 11 is reversed. This reverses the electromotive force applied to the motor armature and when the switch is turned to cut out the resistance 17, the reversed electromotive force applied to the armature 7 will be gradually increased to the maximum electromotive force of the armature 10.

Although I have not shown or described the details of construction of the switches above referred to, it will be understood that these may be of the general type in common use and that various forms of construction and devices for reducing sparking may be used in carrying my invention into practice. It will also be understood that any desired number of resistance steps or supply mains of different potential may be used to increase or decrease the number of different values of electromotive force applied to the translating device or to vary the amount of change between successive values.

Figure 6:
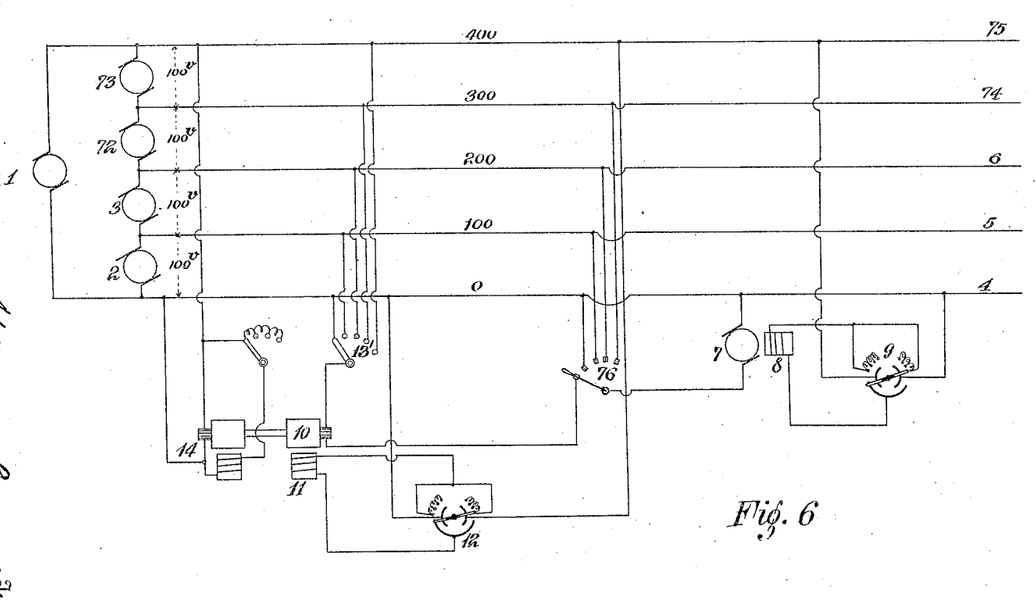
Fig. 6 is a diagram showing my invention applied to a five-wire system.

In Fig. 6 my invention is embodied in a system employing an increased number of supply mains of different potential, five being shown. In addition to the constant potential machines 2, 3 are indicated similar machines 72, 73. These four machines are indicated as each maintaining a potential difference of one hundred volts between the mains 4, 5, 6, 74 and 75. The potentials of the different wires are designated as 0, 100, 200, 300 and 400. The system is similar to that shown in Fig. 1 except that a five-wire system is indicated. The switch 13' is adapted to connect a terminal of armature 10 to each of the supply mains, as explained with reference to Fig. 1, and the mode of operation is as explained with reference to Fig. 1. In Fig. 6 I have indicated a switch 76 adapted to connect the motor armature 7 directly across the different supply mains as above described with reference to Fig. 1 and in these running positions the motor is operated directly from the mains without any intermediate apparatus.

Figure 4:
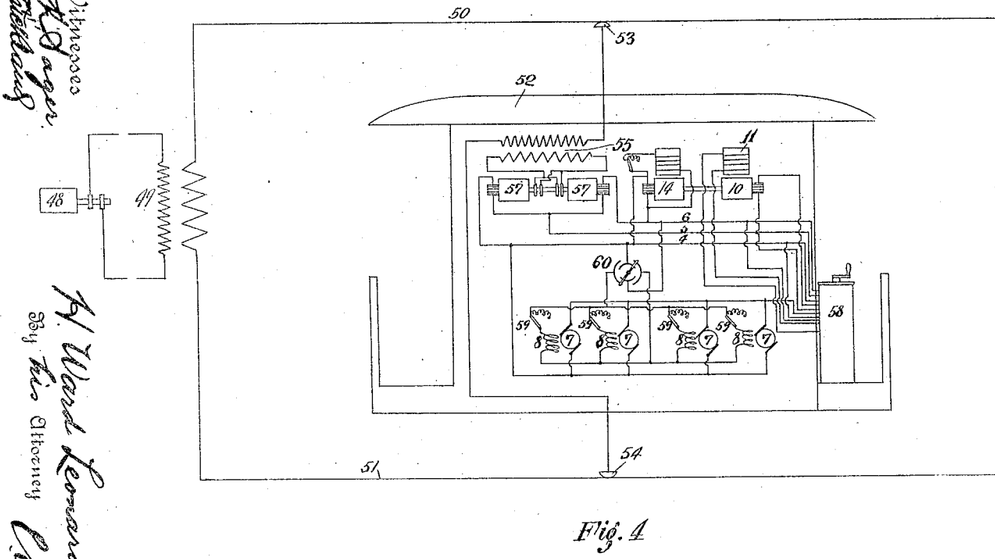
Fig. 4 is a diagram showing my invention embodied in an alternating current railway system.

In Fig. 4 I have shown a form of my invention as embodied in a railway system and as used for varying and controlling the speed of a locomotive or other vehicle. The source of energy is shown as a single phase generator 48 which generates alternating current of high electromotive force and transmits this high potential energy to a distance where it may be transformed to energy of comparatively low electromotive force by means of the transformer 49. The energy is then led to the supply conductors 50, 51 which may be overhead, at the surface, underground, or have one conductor one way and another differently located. The vehicle 52 is indicated in outline and current is conducted to and from the same by means of moving contacts 53, 54. This current may still be of high potential when led on the vehicle and again transformed to a lower potential if desired by means of the static transformer 55. Current from the secondary of this transformer is conducted to the alternating current connections of the two rotary converters 57, 57. These machines are coupled together mechanically and have their commutators connected in series and to the mains 4, 5, 6 which are thus maintained at fixed potentials differing from each other. The motor 14 is connected to the mains 4, 6 and may drive the armature 10 at a practically constant speed as explained in connection with the figures already described. The controller 58 indicates a switch of the type described with reference to Fig. 3 and its operation will connect the armatures 10 and 7 as above explained and also vary the resistance and reverse the connections of the field circuit of winding 11. The electromotive force applied to the armatures 7 can therefore be varied and controlled within close limits and throughout a wide range. Several armatures 7 are coupled in parallel and represent the propelling motors of the vehicle. The field windings 8 of the motors are connected across the mains 4, 6 through rheostats 59. These rheostats afford means for individual adjustment of the field strength of the motors relatively to each other and the reversing switch 60 in the main field circuit will reverse the rotation of the motors so that full speed in the reverse direction may be obtained. Although the railway system is shown with an alternating current supply, it will be desirable in some cases to use a direct current supply.

Figure 5:
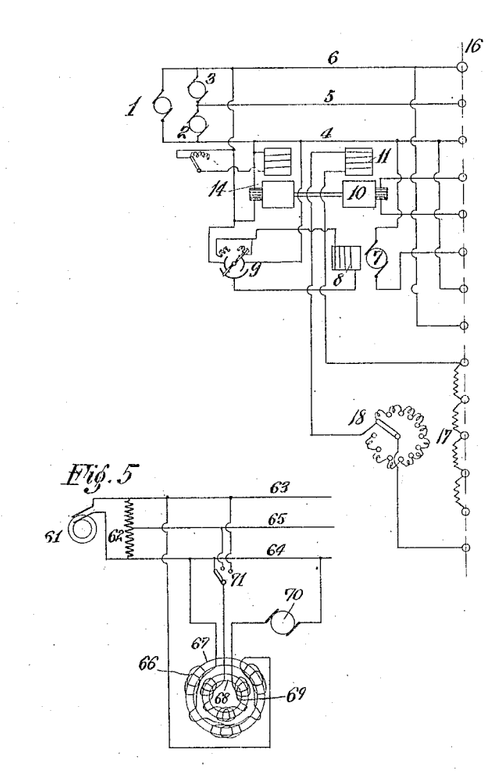
Fig. 5 is a diagram of a modification showing my invention applied to an alternating current system.

Fig. 5 shows one form of my invention in which alternating current is used on three wire supply mains. An alternating current source is indicated at 61 supplying current to the auto-transformer 62. From the latter extends the outside mains 63, 64 and the main 65 from some intermediate point of the transformer. Across the outside mains is connected one winding 66 of a voltage regulator of the induction type, the said winding being wound upon a part 67 which is in inductive relation to a part 68 carrying a second winding 69. The parts 67, 68 are movable with reference to each other and the electromotive force induced in winding 69 is varied by such movement. Any other desired method of obtaining a variable electromotive force in a winding 69 may be employed however. This winding is connected in series with the motor or other translating device 70. The other terminal of the device 70 is connected to one of the outside mains, as 64, and the other terminal of winding 69 is adapted to be connected by switch 71 to any one of the supply mains. If the switch 71 is connected to main 64, and the voltage regulator is shifted so as to induce no electromotive force in the winding 69, then the device 70 will receive no electromotive force at its terminals. By shifting the voltage regulator the electromotive force applied to the translating device may be gradually increased and approach the voltage between the mains 64, 65. The regulator may then be shifted to induce no electromotive force, and switch 71 may then connect to main 65 when the device 70 will receive the electromotive force of mains 64, 65. This electromotive force may then be increased by shifting the regulator. This may then be reduced and connection made to main 63 to give an increased voltage, after which the electromotive force may be still further increased by shifting the regulator to induce its maximum electromotive force.

It will be understood that my invention may be used in connection with either direct or alternating currents, or currents of other form.

It is apparent that in each construction, instead of connecting one terminal of the translating device always to one main, and varying the connections of the variable source, a similar effect will be obtained by connecting one terminal of the variable source to one main and varying the connections of the translating device, or the two ways may be combined, and any such form is equally within the scope of my invention. It will also be understood that my invention may be embodied in various forms of construction and that the scope thereof is limited only as indicated in the following claims.

Having thus described my invention, I declare that what I claim as new and desire to secure by Letters Patent, is,—

1. The combination of a pair of supply mains, a source of gradually varying electromotive force adapted to control a particular translating device, a translating device controlled thereby, and means for connecting said source in series with said device and for connecting a terminal of said series connection to one of said supply mains and another terminal successively to each of said supply mains.

2. The combination of a source of electromotive force and a plurality of supply mains extending therefrom, a second source of electromotive force adapted to specifically control a translating device, a translating device controlled thereby, means for connecting said second source in series with said device and for connecting a terminal of said series connection to one of said supply mains and another terminal successively to each of said mains, and means for gradually varying the electromotive force of said second source.

3. The combination of three or more supply mains, a source of gradually varying electromotive force for controlling a translating device, a translating device controlled thereby, and means for connecting said source in series with said device and to one of said supply mains and also in series across said supply mains.

4. The combination of a source of electromotive force and three or more supply mains extending therefrom, a second source of gradually varying electromotive force, a translating device, and a single controlling switch for connecting said second source and said device in series to one of said supply mains and also in series across said supply mains.

5. The combination of a source of electromotive force and supply mains extending therefrom, a second source of gradually varying electromotive force governing a translating device, a translating device supplied thereby, and a single controlling switch for connecting said second source and said device in series to one of said supply mains and also in series across said supply mains when moved in one direction, and for reversing the current through said translating device when moved in the opposite direction, and for varying the electromotive force of said second source.

6. The combination of a source of electromotive force and supply mains extending therefrom, a second source of gradually varying electromotive force, a translating device, and a single controlling switch for connecting said second source and said device in series to one of said supply mains and also in series across said supply mains and for varying and reversing the electromotive force of said second source.

7. The combination of a source of electromotive force and supply mains extending therefrom, a second source of gradually varying electromotive force, a translating device, and a single controlling switch for connecting said second source in series with said translating device to one of said supply mains, for varying and reversing the electromotive force of said second source and for connecting said translating device across said supply mains.

8. The combination of a source of electromotive force and supply mains extending therefrom, a second reversible source of gradually varying electromotive force, a translating device, and a single controlling switch for connecting said second source in series with said device to one of said supply mains, then connecting the said device directly across said supply mains, and then connecting said second source in series with said device across said supply mains.

9. The combination of a source of electromotive force and supply mains extending therefrom, a second reversible source of electromotive force, a translating device, and a single controlling switch for connecting said second source in series with said device to one of said supply mains, then varying the electromotive force of said second source, and then connecting said second source and said device in series across said supply mains and again varying the electromotive force of said second source.

10. The combination of a source of electromotive force and supply mains extending therefrom, a second source of gradually varying electromotive force, a translating device, and a single controlling switch for connecting said second source in series with said device, then varying the electromotive force of said second source, then connecting said translating device directly across said supply mains, then connecting said second source in series with said device across said supply mains, and then again varying the electromotive force of said second source, said controlling switch having means for reversing the current through said translating device.

11. The combination of multiple voltage supply mains, means for maintaining the voltage upon said mains, a source of gradually varying electromotive force, a translating device, and means for connecting said source of electromotive force in series with said device and successively across different supply mains.

12. The combination of multiple voltage supply mains, a source of electromotive force, means for gradually varying the electromotive force derived from said source, a translating device, and means for connecting said source in series with said device and successively across different supply mains.

13. The combination of supply mains, a source of gradually varying electromotive force, an electric motor having a field winding, means for supplying to said field winding different constant currents, and means for connecting said source in series with the armature of said motor and one of said supply mains and also in series with the armature across said supply mains.

14. The combination of multiple voltage supply mains, a motor generator supplied therefrom, means for varying the field strength of said generator, a motor, and means for connecting the armatures of said generator and motor in series successively across different supply mains and for connecting the motor armature directly across certain of said supply mains.

15. The combination of multiple voltage supply mains, a generator, means for varying the electromotive force of said generator, a motor, and means for connecting the armatures of said generator and motor successively in series across different supply mains and for connecting the armature of said motor directly across certain of said supply mains.

16. In a railway system, the combination of an alternating current supply, means for leading said alternating current upon the vehicle, a plurality of supply mains on the vehicle, a source of electromotive force, a propelling motor, and means for connecting said motor in series with said source and then in series across said supply mains.

17. The combination of a plurality of supply mains, means for supplying direct current thereto, a translating device comprising one or more circuits, a direct current source of variable electromotive force, having a current capacity corresponding to that of the translating device, and a unitary means for connecting said source in series with said translating device and also in series across said supply mains and for reversing said source of electromotive force.

18. The combination of two supply mains, a translating device or a group of translating devices, a source of gradually variable electromotive force whose current capacity corresponds to that of the translating device or groups thereof, and means for connecting said source in series with said devices and for connecting the terminal of said series connection to one of said supply mains and connecting the other terminal successively to each of said supply mains.

19. The combination of a source of electromotive force and a plurality of supply mains extending therefrom, a second reversible source of electromotive force, a translating device or a group thereof whose current capacity corresponds to that of said second source, means for connecting said second source in series with said device and for connecting a terminal of said series connection to one of said supply mains and connecting the other terminal successively to either of said mains, and means for varying the electromotive force of said second source.

20. The combination of a source of electromotive force and supply mains therefrom, a second source, said second source having a maximum electromotive force less than that of the first source, a translating device and a single controlling means for connecting said second source directly in a local loop with said translating device and also for connecting said second source in series with said translating device across said supply mains.

21. The combination of a source of electromotive force and supply mains therefrom, a second reversible source, a translating device, means for connecting said second source in sequence directly in a local loop with said translating device, then in series with said translating device across said supply mains, and then directly across said supply mains.

22. The combination of a source of electromotive force and supply mains therefrom, a second source, said second source having a maximum electromotive force less than that of said first source, a translating device or a group thereof whose ampere capacity is substantially identical with that of the second source, means for connecting said second source directly in a local loop with said translating device and for connecting said second source in series with said translating device across said supply mains, and means for varying the electromotive force of said second source in the same sense as said first source while thus connected in series.

23. The combination of a source of electromotive force and supply mains therefrom, a second source, said second source having a maximum electromotive force less than that of said first source, a translating device, means for connecting said second source directly in a local loop with said translating device and for connecting said second source in series with said translating device across said supply mains, and means for varying the electromotive force of said second source while counter to the electromotive force of said first source when thus connected in series.

24. The combination of a source of electric energy, a motor, an electromotive force producer, means for connecting said producer in series with the armature of said motor across said source, means for gradually varying and reversing the electromotive force of said producer, and means for connecting said motor armature directly across said source.

25. The combination of a source of electromotive force, a motor, an electromotive force producing device whose maximum electromotive force is materially less than that of the source, means for connecting the armature of said motor and said producer in series across said source, the said connecting means being such as to cause the electromotive force of said producer to oppose the electromotive force of said motor, and means for connecting said motor armature directly across said source.

26. The combination of a plurality of conductors of different voltages, a motor, and means for connecting the armature of said motor across each of said voltages successively, said means comprising a gradually variable electromotive force producing device for controlling the electromotive force applied to the motor armature.

27. The combination of conductors adapted to supply different voltages, a motor, a gradually variable electromotive force producing device, and means for connecting the armature of said motor directly across each of said voltages and for connecting said motor armature in series with said device across each of said voltages.

28. The combination of a source of electric energy adapted to supply alternating current energy, an energy transforming device supplied therefrom, a motor, means for connecting in series with each other the motor armature and a secondary element of said transforming device and for changing the electromotive force produced by the secondary element.

29. The combination of a source of electric energy, an energy transforming device supplied therefrom, a motor, and means for connecting the armature of said motor directly across a winding of said transformer so as to be subjected to the full electromotive force of said winding, and for connecting said motor armature and said winding in series across said source, and for reversing said motor independently of a reversal of the connections of the motor armature, said means comprising a single movable operating element adapted when moved to effect said connections.

30. The combination of means for maintaining a plurality of fixed electromotive forces, a translating device, a gradual electromotive force producer for controlling the electromotive force upon that translating device specifically, and means for connecting said producer in series with said device across a plurality of said electromotive forces.

31. The combination of means for maintaining a plurality of fixed electromotive forces, a translating device, an electromotive force producer, and means for connecting said translating device and said producer in series across a plurality of said fixed electromotive forces and for connecting said translating device directly across one or more of said fixed electromotive forces.

32. The combination of a source of electromotive force, a second source of electromotive force of approximately half the electromotive force of the first source, a translating device, means for applying to said device any desired electromotive force within the capacity of said second source, for supplying to said device an electromotive force which is the resultant of said two sources and for directly connecting said device across said first source.

33. The combination of a source of electric energy, an electromotive force transformer, a translating device, and means for supplying said device with current directly from said transformer, for connecting said device and a winding of said transformer in series across said source, for connecting said translating device directly across said source, and for reversing the electromotive force derived from said transformer.

34. The combination of a source of electric energy, an electromotive force transformer having a primary and secondary winding, a translating device, and means for reversing the electromotive force of said secondary winding, for supplying said device with current directly from said secondary winding, for connecting said device and said secondary winding in series across said source, and for connecting said device directly across said source.

35. The combination of a source of electric energy, an electric motor operated by energy derived therefrom, an electromotive force transformer having two windings, the primary winding having a higher electromotive force than the secondary winding, and means for supplying the armature of said motor with energy directly from said secondary winding for low speed, and for placing said device in series with said secondary winding across said source for obtaining higher speeds.

36. The method of operating an electric motor which consists in connecting it across a source of electromotive force variable over a certain limited range for operating the motor at low speeds, and connecting said motor armature in series with said source of electromotive force and across the source of higher electromotive force for operating the motor at higher speeds.

37. The method of varying the electromotive force applied to a motor armature, which consists in impressing upon the motor armature circuit any desired voltage of a multiple voltage system and developing in series with said impressed voltage an auxiliary voltage and varying said auxiliary voltage gradually between certain limits.

38. The method of controlling the electromotive force applied to the armature of an electric motor, which consists in supplying to the motor armature circuit any desired electromotive force between limits by applying increments of electromotive force step by step from a multiple voltage source of electromotive force, and securing intermediate electromotive forces by generating in series with the motor armature an electromotive force produced in a certain winding and varying said latter electromotive forces at the will of the operator independently of change in the connections of said winding.

39. In a railway system, the combination of a source of alternating electric energy, means for leading such alternating energy on the vehicle, means on the vehicle for deriving from said energy a divided source of low electromotive force, a second source of electromotive force also carried by the vehicle, a propelling motor, and means for connecting at least one element of said motor in series with different portions of said divided source of low electromotive force.

40. The combination of a source of alternating electromotive force, a multiple voltage system derived therefrom, means for securing by magnetic induction any desired potential intermediate the potentials of the multiple voltage system, a translating device, and means for connecting said device between said means for producing the intermediate potential and the main having the desired potential of the multiple voltage system whereby a refined control of the electromotive force upon said device may be secured.

41. The combination of a source of alternating electromotive force, a multiple voltage system derived therefrom, a motor operated by energy from said multiple voltage system, and means for generating in series with the motor by magnetic induction a regulable electromotive force and thereby controlling the motor.

42. The combination of a source of constant electromotive force, electro-magnetic means for sub-dividing said electromotive force into fractional parts of the total electromotive force, electro-magnetic means for securing desired potentials intermediate the potentials of said sub-divisions, an electric motor, and means for connecting said motor between said point of intermediate potential and one of the conductors connected to said source.

43. The combination of a source of constant electromotive force, electro-magnetic means for securing a plurality of divisional electromotive forces, an electric motor, and electro-magnetic means for securing in combination with said divisional electromotive forces any desired electromotive force for controlling the speed of the motor.

44. The combination of a main source of electromotive force, means for deriving a divided source of electromotive force therefrom, the divisional electromotive forces being constant, means for developing a regulating source of electromotive force, an electric motor, and means for subjecting said motor to the resultant effect of combining said regulating source with any desired division of said source of electromotive force.

45. The method of varying the electromotive force of a work circuit which consists in successively impressing upon said circuit a plurality of different voltages and supplementing said impressed voltages by auxiliary voltages variable uninterruptedly from approximately zero to approximately the potential difference of said impressed voltages.

46. The method of varying the electromotive force of a work circuit which consists in supplying to the said circuit voltages that are the resultants of fixed voltages and auxiliary voltages which are varied uninterruptedly between approximately zero and values approximately equal to the difference between said fixed voltages.

47. The method of varying the electromotive force of a work circuit which consists in supplying to said circuit a certain fixed voltage, then supplying to the circuit a gradually changing voltage which is the resultant of said fixed voltage and an auxiliary voltage which is varied progressively and uninterruptedly, and then supplying to the circuit a certain different fixed voltage.

48. The method of varying the electromotive force impressed upon a work circuit which consists in supplying to said circuit two different fixed electromotive forces and supplying to the circuit a series of progressively varying electromotive forces which are the resultant of a combination of the fixed electromotive forces with a supplementary variable electromotive force.

49. The method of operating an electric translating device which consists in connecting the same successively to supply circuits of decreasing voltage and in introducing an electromotive force producing means in series with the device between the same and the low voltage supply circuit for individually controlling said device when effecting a reduction of voltage.

50. The method of operating an electrical translating device which consists in connecting the same to a circuit of high voltage, then connecting the device to a circuit of lower voltage and in series with an electromotive force producing device adapted to specifically control that particular device.

51. The method of changing the connection of a translating device from a high voltage circuit to a circuit of lower voltage which consists in breaking the connection of one terminal of the device with the high voltage circuit and then connecting in series with the device a gradually variable electromotive force producing device and connecting the translating device and the electromotive force producing device in series with each other across the circuit of lower voltage.

52. The method of operating an electrical translating device which consists in connecting the same to a high voltage conductor, connecting in series with the device an electromotive force producing device, varying the electromotive force produced by said latter device, connecting said translating device and said electromotive force producing device while in series with each other to a conductor of lower voltage, and again varying the electromotive force of said electromotive force producing device.

53. In a system of control for electrical apparatus, a source of multiple voltage energy, a regulating auxiliary gradually variable electromotive force producing device, and means for including said regulating device in the circuit of said electrical apparatus in changing from one voltage to another.

54. In a system of control the combination with an alternating current supply circuit, a transformer operated therefrom which is subdivided, an electromotive force producing device and a translating device, of means for connecting said device between points of subdivision of said transformer, for connecting the same in series with a portion of said transformer winding, and for cutting the latter device out of circuit of said translating device.

55. The method of operating an electric motor which consists in generating single phase energy, deriving therefrom multiple voltage energy, supplementing the voltages of said energy by a separate variable voltage, supplying to the winding of the motor different resultant voltages to produce different speeds of the motor and retarding the motor by causing the latter to generate electric energy.

56. The method of electrically braking a vehicle which consists in generating electric energy by the movement of the vehicle, supplying such energy to a circuit on the vehicle, connecting said circuit successively across different parts of a multiple voltage system on the vehicle, and transforming the transferred energy to single phase alternating current energy.

57. The combination of a single phase system, a motor vehicle, means on the vehicle for supplying a multiple voltage system in which the various divisional voltages are in series with each other, and means for including a propelling motor in a circuit which includes successively smaller electromotive forces of the multiple voltage system, whereby single phase electric energy is re-generated.

58. The combination of a source of electromotive force, a source of variable electromotive force, an electric motor, a controller for making and breaking the circuit and for connecting said sources in series with the armature of said motor, for varying the electromotive force of said second source and for changing the circuit connections of said second source with reference to said first named source, and a second controller for reversing the circuit connections of a field winding of said motor for reversing the direction of rotation thereof.

59. The combination of a source of constant electromotive force, a source of variable electromotive force, an electric motor, a controller for making and breaking the circuit connections and changing the circuit relations of said sources to the armature winding of said motor, and means for reversing the connections of a field winding of said motor.

60. The combination of a source of electromotive force, a second source of electromotive force, a device having an electromotive force producing winding, an electric motor and a controller for connecting said sources, winding and motor in series and for changing the relation of said winding, and means for reversing the direction of rotation of the motor.

61. The combination of means for producing a divided electromotive force, an additional source of electromotive force, an electric motor, and a single controller having contacts for connecting said additional source and a winding of said motor in series with different divisions of said divided electromotive force and separate means for reversing the motor.

62. The method of controlling an electric motor which consists in supplying to the motor armature energy of a constant electromotive force and energy of a variable electromotive force jointly, then supplying to the motor armature energy of a different constant electromotive force and energy of a variable electromotive force jointly, and then supplying to the motor armature energy of all three electromotive forces jointly.

In testimony whereof I affix my signature, in presence of two witnesses.

H. WARD LEONARD.

Witnesses:
L. R. SAGER,
GEO. A. HOFFMAN.